June 9, 1964 A. W. PAYNE 3,136,351
PRESS AND FEED MECHANISM THEREFOR
Filed March 9, 1961 10 Sheets-Sheet 1

INVENTOR.
ARTHUR W. PAYNE
BY
Barnes, Kisselle, Raisch & Choate
ATTORNEYS

June 9, 1964  A. W. PAYNE  3,136,351
PRESS AND FEED MECHANISM THEREFOR
Filed March 9, 1961  10 Sheets-Sheet 2
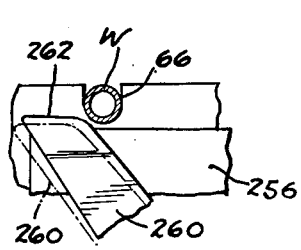
FIG. 5
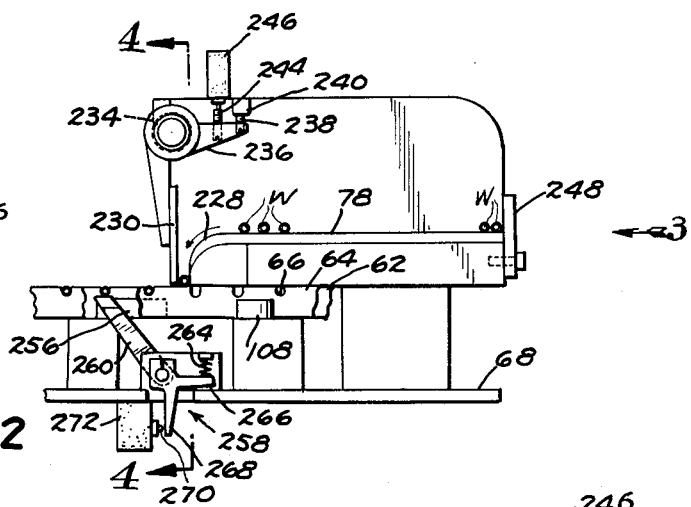
FIG. 2
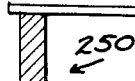
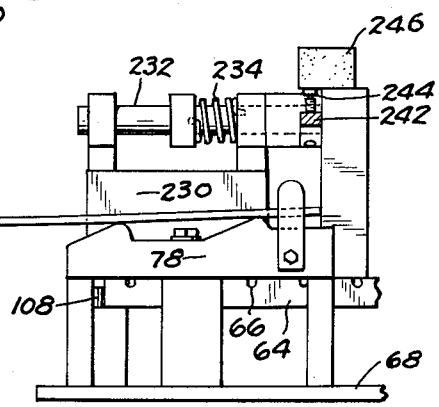
FIG. 3
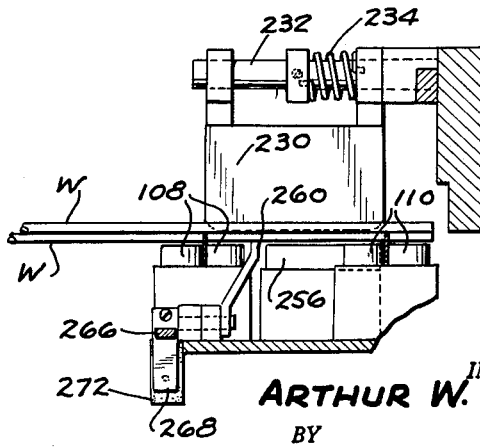
FIG. 4
INVENTOR.
ARTHUR W. PAYNE
BY
Barnes, Kisselle, Raisch & Choate
ATTORNEYS June 9, 1964  A. W. PAYNE  3,136,351
PRESS AND FEED MECHANISM THEREFOR
Filed March 9, 1961  10 Sheets-Sheet 3

INVENTOR.
ARTHUR W. PAYNE
BY
Barnes, Kisselle, Raisch & Choate
ATTORNEYS

June 9, 1964  A. W. PAYNE  3,136,351
PRESS AND FEED MECHANISM THEREFOR
Filed March 9, 1961  10 Sheets-Sheet 4

INVENTOR.
ARTHUR W. PAYNE
BY
Barnes, Kisselle, Raisch & Choate
ATTORNEYS

INVENTOR.
ARTHUR W. PAYNE
BY
Barnes, Kisselle, Raisch & Choate
ATTORNEYS

June 9, 1964 A. W. PAYNE 3,136,351
PRESS AND FEED MECHANISM THEREFOR
Filed March 9, 1961 10 Sheets-Sheet 7
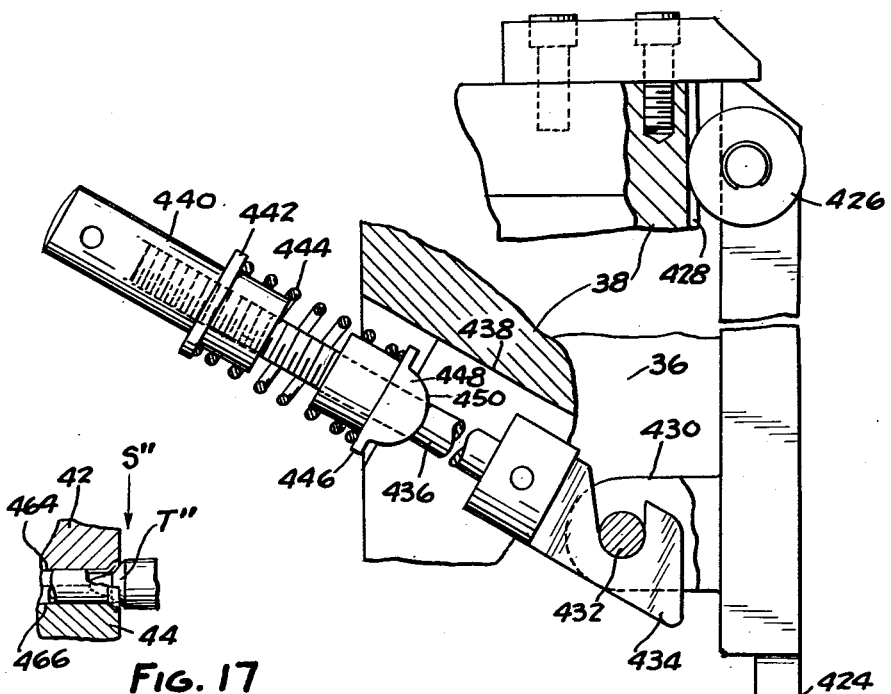
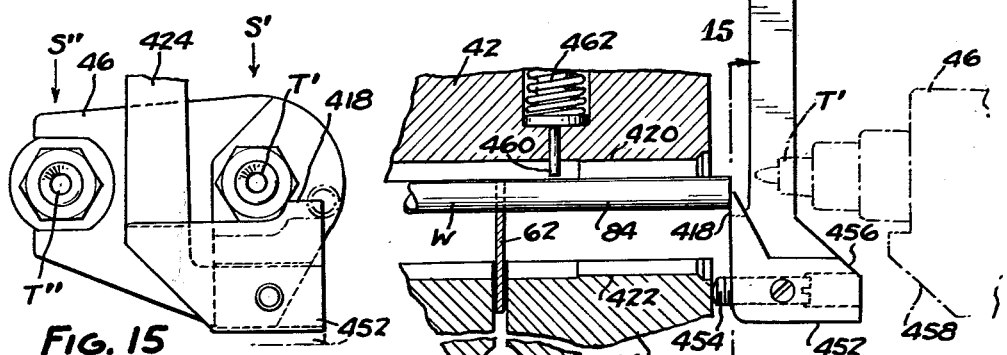
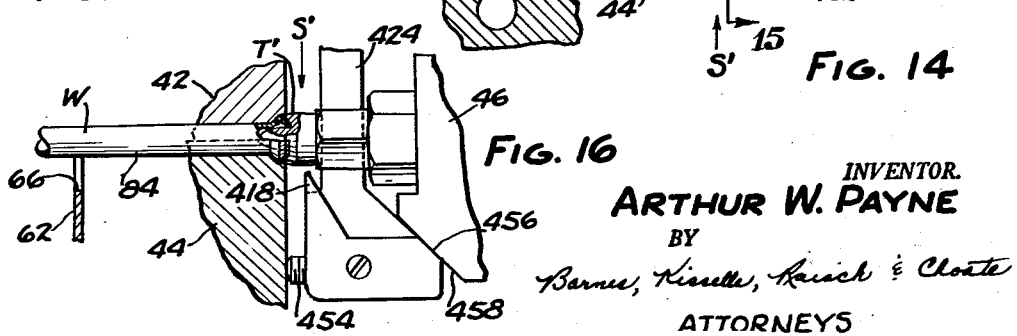
INVENTOR.
ARTHUR W. PAYNE
BY
Barnes, Kisselle, Raisch & Choate
ATTORNEYS INVENTOR.
ARTHUR W. PAYNE
BY
Barnes, Kisselle, Raisch & Choate
ATTORNEYS June 9, 1964  A. W. PAYNE  3,136,351
PRESS AND FEED MECHANISM THEREFOR
Filed March 9, 1961  10 Sheets-Sheet 10
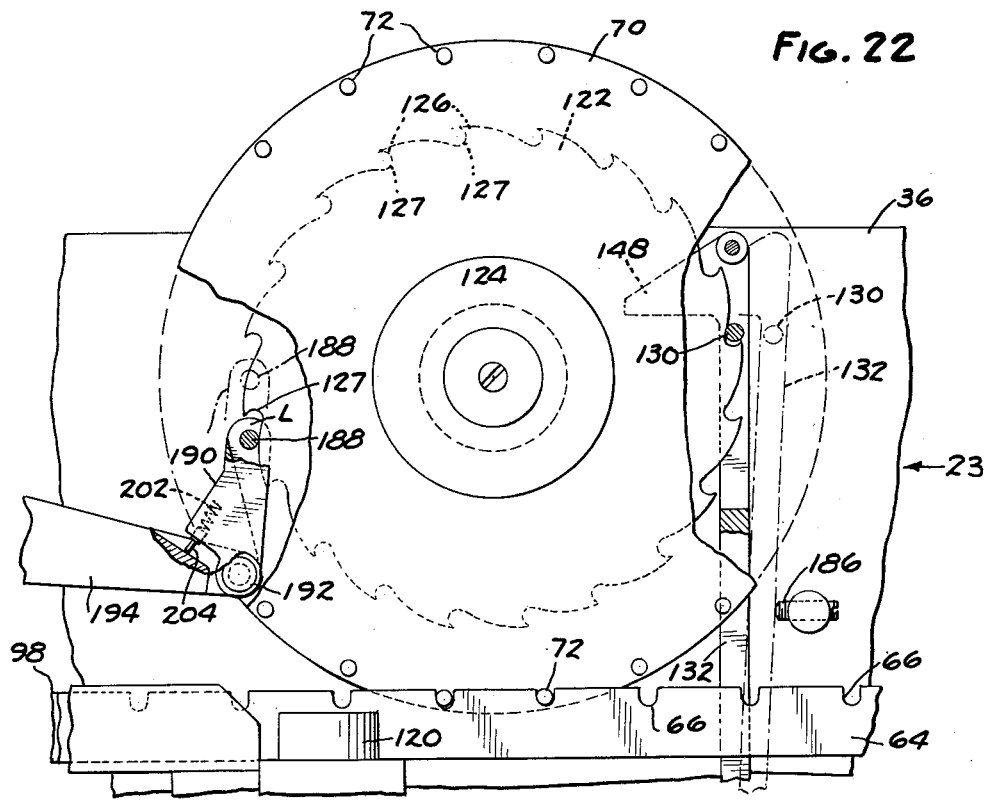
FIG. 22
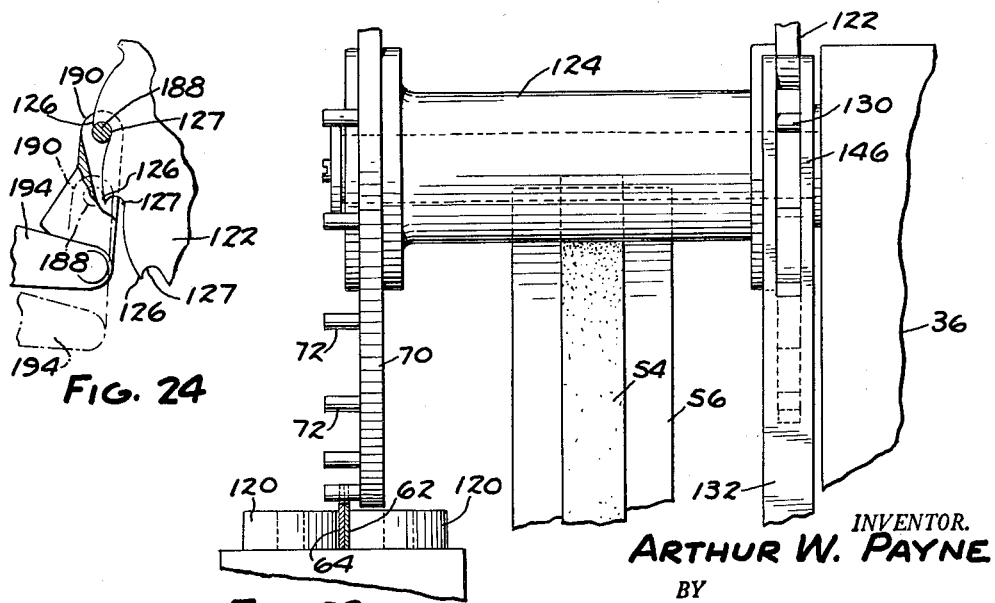
FIG. 24
FIG. 23
INVENTOR.
ARTHUR W. PAYNE
BY
Barnes, Kisselle, Raisch & Choate
ATTORNEYS

United States Patent Office 3,136,351
Patented June 9, 1964

3,136,351
PRESS AND FEED MECHANISM THEREFOR
Arthur W. Payne, Rochester, Mich., assignor to Bundy Tubing Company, Detroit, Mich., a corporation of Michigan
Filed Mar. 9, 1961, Ser. No. 94,533
36 Claims. (Cl. 153—2)

This invention relates generally to a machine for performing work on elongate workpieces, such as lengths of tube, and to mechanisms for feeding and conveying the workpieces in a continual succession through the machine. The invention is also concerned with means for detecting malfunctions of the feeding mechanism and automatically bringing the conveyor to rest quickly. Selected for illustration of the invention is a type of press generally referred to in the art as a relatively light duty cold header.

According to the general arrangement, the press operates continuously with the work-performing components reciprocating to and from their working positions. A workpiece conveyor is intermittently propelled past the working components by the drive for the press through a connection which is disconnected whenever a sensing device detects a malfunction of the mechanism which positions the workpieces on the conveyor. The press proper continues to run so that it is not necessary to stop and start it whenever a malfunction occurs.

One general object of the invention is to provide an improved, inexpensive, relatively simple conveyor structure and propelling structure for the conveyor. Another general object is to provide a relatively simple, inexpensive device for detecting failures or malfunctions of the workpiece-feeding mechanism, and associated apparatus of improved nature which will operate in a foolproof manner to bring the conveyor to rest with the workpieces clear of the working components of the press so that the press can be used reliably in automatic production without danger of damage-causing jams or production of incomplete articles.

Generally the invention contemplates a conveyor comprising a pair of endless flexible steel bands having notched edges which provide receptacles for the workpieces and which are also engaged by pins on a propelling wheel which propels the bands in closed circuits through the feed and work regions of the press. The wheel is intermittently driven by a reciprocating pawl through a ratchet wheel. Sensing devices, through interposed circuitry and linkage, keep the pawl engaged with the ratchet wheel during proper operation of the feeding mechanism and when any one of these devices detects a feeding malfunction, it causes the pawl to be swung away from the ratchet wheel in its next return stroke. Then a second pawl advances the ratchet wheel a half step to bring the conveyor to rest with the workpieces clear of the working parts of the press.

One form of the invention is shown in the accompanying drawings.

FIG. 2 is a fragmentary front elevational view of the mechanism for feeding tubes to the conveyor.

FIG. 3 is a view looking in the direction of arrow 3 of FIG. 2.

FIG. 4 is a generally sectional view on line 4—4 of FIG. 2.

FIG. 5 is an enlarged fragmentary view of a part of the mechanism shown in FIG. 4.

FIG. 14 is a fragmentary view partly in vertical section at the first work-performing station of the press.

FIG. 15 is a view taken on line 15—15 of FIG. 14.

FIG. 16 is a fragmentary view at the first working station of the press showing the relation of the parts during the work stroke.

FIG. 17 is a fragmentary view illustrating the working components of the press at the second work station.

FIG. 22 is an enlarged fragmentary partly sectional view of the conveyor-propelling wheel and its ratchet and pawl drive.

FIG. 23 is a fragmentary generally elevational view looking in the direction of arrow 23 in FIG. 22.

FIG. 24 is a fragmentary view illustrating the action of the ratchet wheel and an auxiliary pawl after the main drive has been disconnected.

Figure 1:
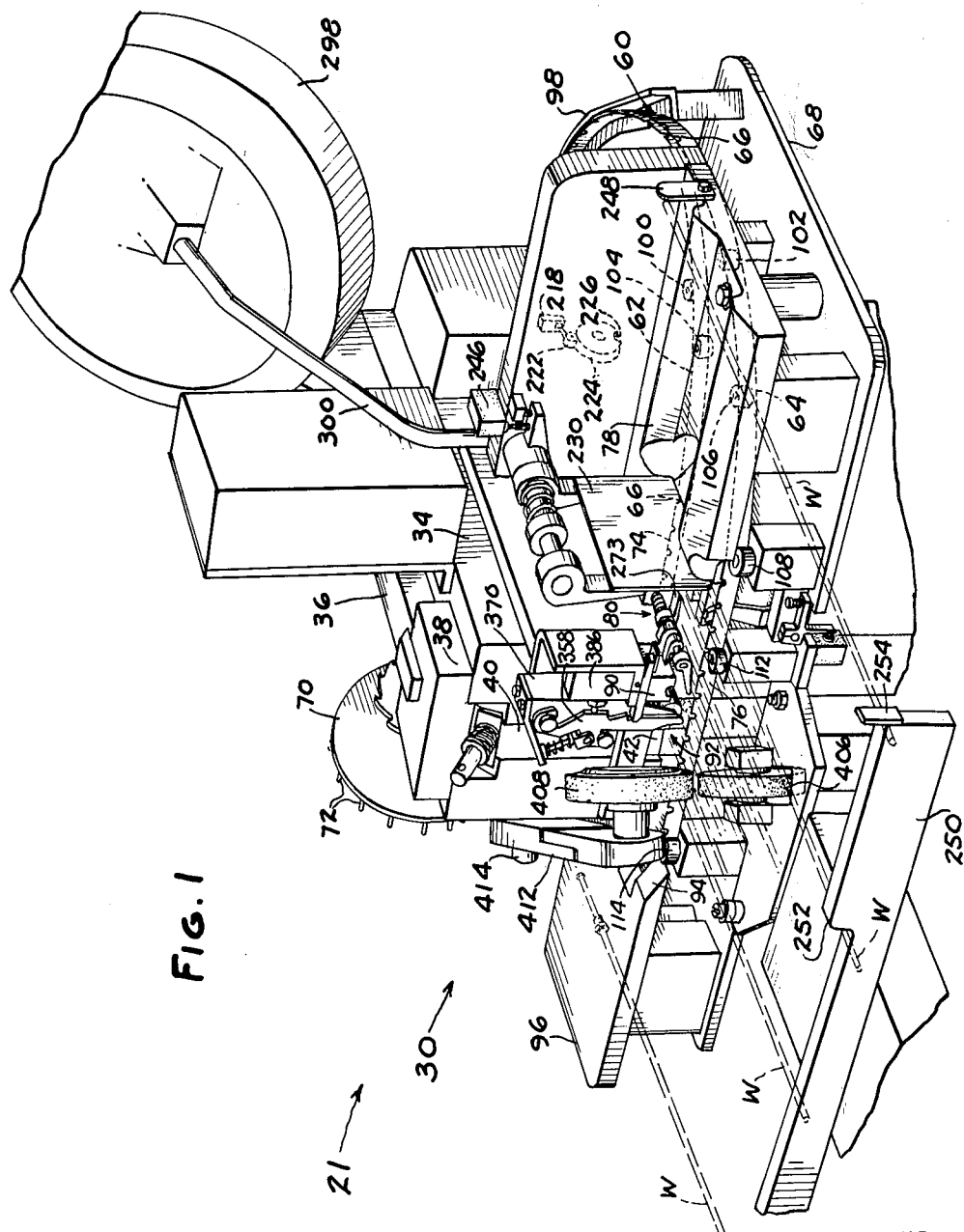
FIG. 1 is a perspective view illustrating a press incorporating components according to this invention.
Figure 21:
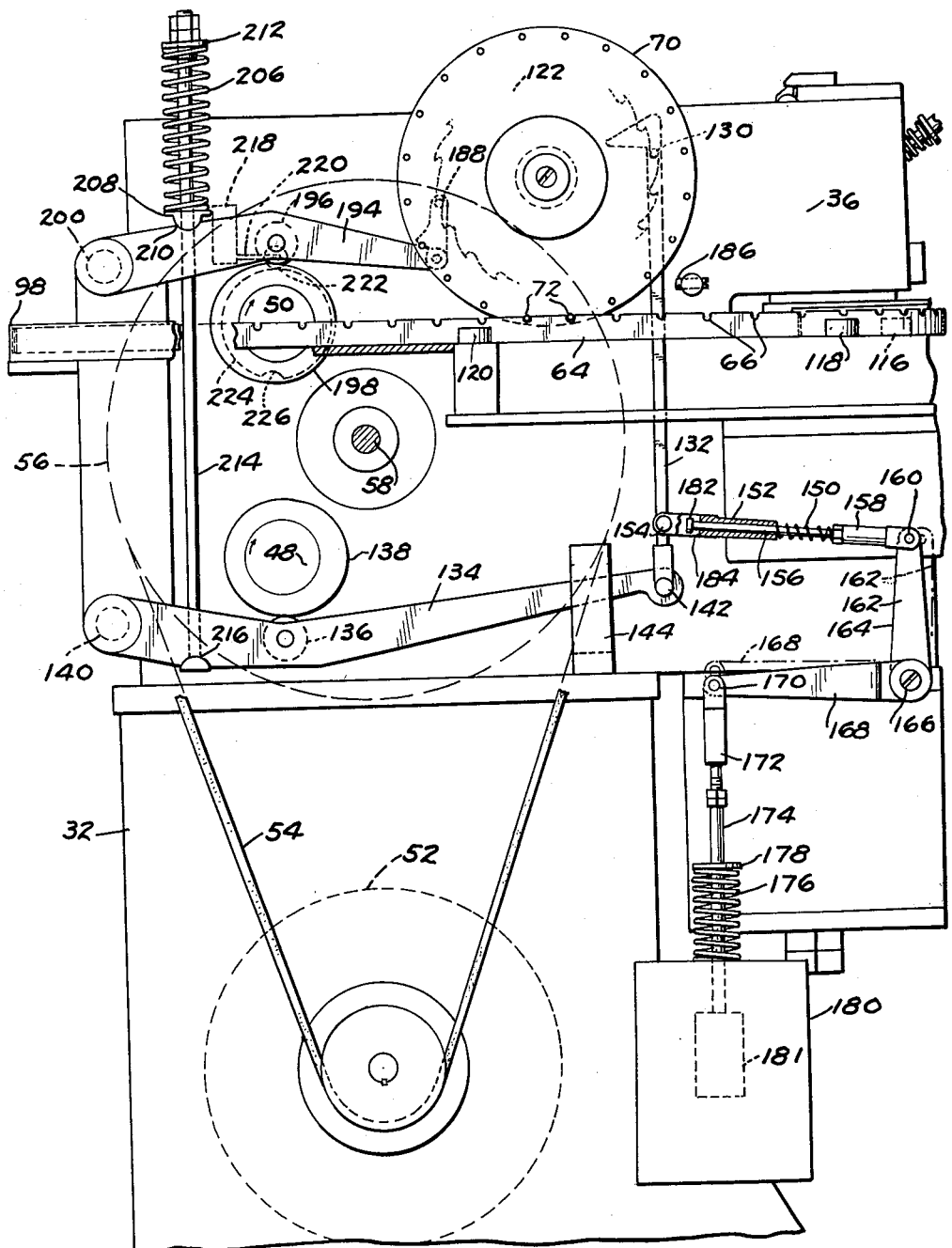
FIG. 21 is a generally elevational view of the press looking in the direction of arrow 21 in FIG. 1 and showing the propelling means for the conveyor.

The machine 30 shown in the drawings includes a base 32 (FIG. 21) supporting a pair of steel slabs 34 and 36 anchored in spaced-part relation by bolted means including a T-shaped block 38 (FIGS. 1 and 14). The working components of the press per se are located in the space 40 between the slabs. The working components include an upper stationary die-jaw 42 (FIGS. 1 and 14), a lower vertically reciprocating die-jaw 44, and a pair of tools T' and T" (FIGS. 14–17) carried by a horizontally reciprocating tool carrier 46. Jaw 44 is reciprocated by a crank (not shown) mounted between slabs 34 and 36 and journaled thereon through a crank shaft 48 (FIG. 21). The tool carrier is reciprocated by another crank (not shown) also mounted between the slabs and journaled thereon through a crank shaft 50 (FIG. 21).

The structural details of the press per se are disclosed in my co-pending application entitled "Press for Performing Work on Metal Workpieces," serial number and filing date as yet unknown. The cranks are driven by an electric motor 52 through belting 54 and a fly wheel 56 journaled on slabs 34 and 36 through a shaft 58 having gearing (not shown) engaged with gearing on crank shafts 48 and 50.

Workpieces W are translated in a succession between die-jaws 42, 44 by a conveyor 60 which comprises two endless steel bands 62 and 64 each having its upper edge notched to provide a longitudinally spaced-apart series of workpiece receiving receptacles 66. The conveyor and other components of the feed mechanism for the press are mounted on a table 68 supported by frame 32. The conveyor bands are propelled in unison in closed circuits clockwise as FIG. 1 is viewed around the press by a wheel 70 having laterally projecting pins 72 which engage in notches 66 in the bands, the wheel being intermittently turned by mechanism described below. The portions of the bands 74 and 76 (FIG. 1) passing through the feed area are spaced apart in generally parallel relation with their receptacles 66 in paired alignment along lines generally perpendicular to the path of travel of the bands.

Figure 6:
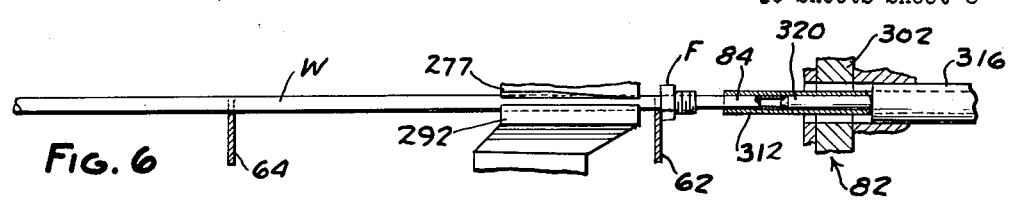
FIG. 6 is a diagrammatic view, partly in section, taken at a station downstream of the feed mechanism, and illustrating a device for passing a nut over an end of the workpiece.

An aligned pair of receptacles 66 first passes beneath a feed table 78 at which a workpiece is deposited into them. The workpiece is then translated to the left, as FIG. 1 is viewed, to a station generally indicated by arrow 80 at which there is a device 82 (FIGS. 6 and 10), for assembling a fitting F onto an end 84 of workpiece W projecting inwardly of conveyor band 62.

Figure 7:
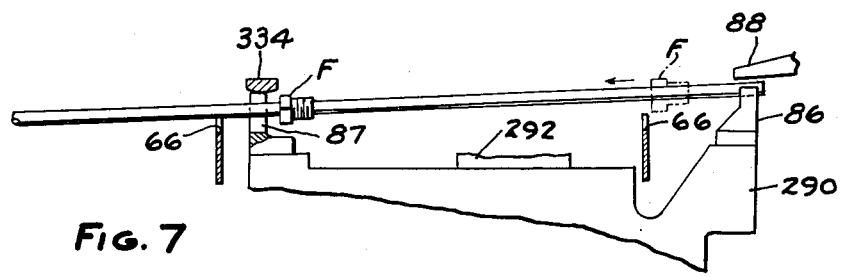
FIG. 7 is a diagrammatic view showing a subsequent station in the press where the fitting is repositioned on the workpiece.
Figure 8:
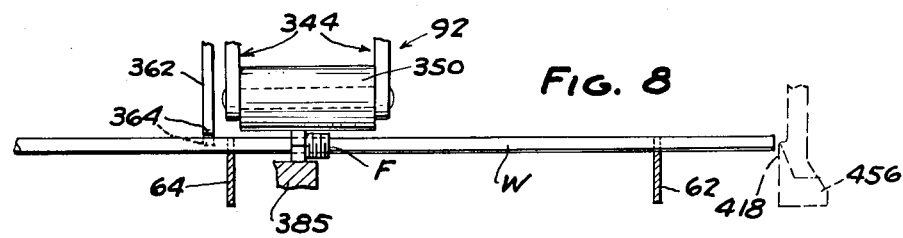
FIG. 8 is a diagrammatic view of a subsequent station wherein a sensing device detects the presence or absence of the fitting in its proper location.

At the next station (FIGS. 7, 10, and 11) tube end 84 is elevated out of the receptacle in band 62 by two forks 86 and 87 and a jet of air from nozzle 88 in a hood 90 moves the fitting toward the front of the machine, as FIG. 1 is viewed, or toward the left, as FIG. 7 is viewed, to a location where it will follow a path clear of die-jaws 42, 44. At the next station (FIGS. 8 and 11–13) a sensing device 92 detects whether or not fitting F is in its proper location; and it if is not, the sensing device actuates circuitry for stopping the conveyor.

The next two stations are the work-performing stations S' and S" (FIGS. 14–17 and 25) wherein the workpiece is clamped between die-jaws 42, 44 and work is performed thereon by tools T' and T" in two successive stages. Downstream of the work stations is a pair of inclined forks 94 which ramp the workpieces out of their receptacles 66 onto a discharge table 96.

After passing between forks 94, the conveyor bands turn to the right, as FIG. 1 is viewed, and converge into side-by-side engagement with their receptacles paired for receiving propelling pins 72 on propelling wheel 70. The bands are then intermittently advanced around the back of the machine and emerge on the right-hand side where they are again separated for picking up and conveying additional workpieces W.

In passing behind the press, the conveyor bands are guided in side-by-side relation by a track 98; and when they emerge from the track, they are separated and guided through the feeding, assembling, and working stations by rollers such as those indicated at 100, 102, 104, and 106 (FIG. 1) and paired rollers 108 and 110. (FIGS. 1 and 4) and paired rollers 112 and 114 (FIG. 1), all of the rollers engaging side faces of the bands as shown. After passing the working stations and discharge ramps 94 the bands are guided toward feed wheel 70 and brought into side-by-side engagement by rollers such as those indicated at 116, 118, and 120 (FIGS. 21–23). After passing feed wheel 70 the bands return to guide 98.

Pins 72 are substantially rigid so that by engagement within notches 66 they maintain the relative positioning of bands 62, 64 to keep the notches in proper paired alignment while they pass through the feed, assembly, and working stations of the press. The frictional resistance to movement of the conveyor bands at track 98 and the various rollers is sufficient to stop movement of the conveyor bands immediately when the motive force of wheel 70 ceases.

The motor means for propelling wheel 70 are illustrated in FIGS. 21–24. This motor means includes a ratchet wheel 122 mounted on an axle 124 which carries feed wheel 70 and which is journaled on slab 36 forming one of the frame members of the press itself. The ratchet wheel has an alternate circumferential series of ratchet teeth 126 and recesses 127 which are successively engaged by a pawl 130 on an arm 132 which is vertically reciprocated by a rocking lever 134 having a cam-following roller 136 engaging a cam 138 on crank shaft 48. Lever 134 has a pivotal mount 140 and is pivotally connected to arm 132 at 142. A guide for lever 134 is illustrated at 144. The pawl arm has an upper end 146 with a bifurcate projection 148 whose spaced apart portions embrace opposite sides of ratchet wheel 122 to stabilize the upper end of the pawl arm.

Pawl arm 132 is yieldably biased toward engagement with the ratchet wheel by a spring 150 acting against a sleeve 152 pivoted onto the pawl arm at 154 and slidably engaged around a rod 156, the spring reacting against a link 158 pivoted at 160 onto a vertical arm 162 of a bell crank 164 pivoted at 166 on frame 32. The bell crank has a horizontal arm 168 pivotally connected at 170 to a link 172 on a rod 174 biased upwardly as FIG. 21 is viewed by a spring 176 acting against a flange 178 on the rod and reacting against a housing 180 on frame 32 into which the rod slidably projects. A solenoid 181 contained within housing 180 in actuated condition holds rod 174 downwardly against the action of spring 176 to maintain pawl arm 132 in biased engagement against the ratchet wheel.

Rod 156 is provided with a head 182 which engages a shoulder 184 on sleeve 152, when solenoid 181 is inactuated and spring 176 rocks bell crank 164 to the dotted line position, for swinging pawl arm 132 out of engagement with the ratchet wheel as shown in dotted lines in FIG. 23. An adjustable stop 186 limits this swinging movement of the pawl arm.

A second pawl 188 is supported on a finger 190 pivoted at 192 to the end of a second rocking lever 194 carrying a cam-following roller 196 engaged with a cam 198 on crank shaft 150, rocking lever 194 being pivotally mounted as at 200. Pawl 188 is yieldably biased into engagement with the ratchet wheel by a spring 202 acting against finger 190 and reacting against rocking lever 194 through a pin 204.

Rocking levers 134 and 194 are yieldably secured into engagement with cams 138 and 198 respectively by a compressed spring 206 acting on a washer 208 having a spherical projection 210 engaged within a complementary receptacle in rocking lever 194 (FIG. 21) and reacting against a washer 212 on a rod 214 having a spherical head 216 at its lower end engaged within a complementary receptacle in rocking lever 134.

Rocking lever 194 is shorter than rocking lever 134 so that the overall vertical stroke of pawl 188 is somewhat less than half the overall vertical stroke of pawl 130. More specifically, the stroke of pawl 130 is sufficient in each cycle to move upwardly out of a recess 127, clear the cusp of the succeeding ratchet tooth 126, and drop into the next recess so that it will turn the ratchet wheel and wheel 170 for advancing the conveyor bands one full step which is substantially the distance between receptacles 66. To the contrary, the stroke of pawl 188 is slightly less than the overall distance between a recess 127 and the end of the succeeding tooth 126 as illustrated by the solid and dotted line positions of the parts in FIG. 24 for a purpose to be described. The effective stroke of pawl 188, once it is engaged in a recess 127, is substantially one-half of the effective stroke of pawl 130.

Pawls 130 and 188 are generally diametrically oppositely disposed relative to the ratchet wheel. The lobes of cams 138 and 198 are angularly disposed about 180° apart (FIG. 21) and levers 134 and 194 generally simultaneously are rocked in opposite directions by the cams, since crank shafts 48 and 50 turn in unison. During each cycle of movement under the action of pawl 130, ratchet wheel 122 will overrun pawl 188 and at the end of each cycle pawl 188 will lag behind the adjacent recess 127 as represented at L (FIG. 22).

Controls are provided for maintaining pawl 130 in a position for engaging successive ratchet recesses 127 for so long as the various workpiece feeding, assembling, and positioning mechanisms are functioning properly and for swinging pawl arm 132 to the right as FIGS. 21 and 22 are viewed to disengage it from the ratchet wheel in the event of a malfunction of these mechanisms. The controls include a number of sensing devices each one of which detects the proper or improper functioning of one of the various mechanisms and either maintains circuitry for continued operation of pawl 130 or conditions the circuitry for retracting the pawl.

The element which actuates the pawl-retracting circuitry is a switch 218 having a toggle arm 220 with a cam-following roller 222 engaged with a circular cam 224 mounted on crank shaft 50 and having a notch 226 into which the follower falls to trip switch 218 during the upward movement of pawl arm 132 (FIGS. 1 and 21). The preconditioned circuitry is thereupon actuated to deenergize solenoid 181 so that spring 176 rocks crank arm 164 clockwise as FIG. 21 is viewed to swing pawl arm 132 to the dotted line position of FIG. 22 wherein pawl 130 is retracted from engagement with the ratchet wheel.

Subsequently motor 52 and crank shafts 48 and 50 continue to turn, and cam 198 rocks lever 194 upwardly so that pawl 188 takes up the slack or lag L, engages in a recess 127, and moves the ratchet wheel through one-half of its normal increment of rotation. Wheel 170 and conveyor bands 62, 64 are thus also advanced one-half step and then come to rest. Pawl 188 continues to reciprocate under continued rotation of cam 198 but its downward travel is insufficient to clear the succeeding tooth 126 with the result that the ratchet wheel 70 and bands remain at rest.

After the malfunction has been corrected, circuitry is conditioned for again energizing solenoid 181 to rock bell crank 164 against the action of spring 176 and swing pawl arm to the solid line position of FIG. 22 so that pawl 130 resumes intermittent movement of the ratchet wheel. Here again the element which actuates the conditioned solenoid-energizing circuitry is switch 218 which is operated when roller 222 drops into cam recess 226 at a time when pawl arm 132 is moving in an upward direction.

The various sensing devices can best be understood through a detailed consideration of the several mechanisms with which they are associated.

Feed table 78 has a rounded lip 228 (FIG. 2) adjacent which is a vertical plate 230 rockably suspended from a shaft 232 and biased toward table 78 by a torsion spring 234. Integral with the plate is a projection 236 carrying an adjustable screw 238 which engages a stop 240 to position the plate at a proper distance from table 78 for receiving workpieces W in vertical single file. The workpieces cascade over the lip and are supported from beneath by the tops of the conveyor bands. As the bands move beneath them, the lowest workpiece drops into a pair of receptacles 66 and is carried to the left as FIGS. 1 and 2 are viewed toward the next station. The tops of the bands support the succeeding workpieces until successive receptacles carry them away in like manner.

A switch lever 242 projects from shaft 232 and as long as workpieces are flowing normally between plate 230 and feed table 78 this lever holds in depressed condition the plunger 244 of a switch 246 and the circuitry involving solenoid 181 remains uninfluenced. In the event that the workpieces should become jammed between the feed table and plate 230, plate 230 will be swung to the left as FIG. 2 is viewed. Lever 242 will be depressed and switch plunger released to operate switch 246 and thereby sense the jam and condition the solenoid circuitry for inactivation upon the next dropping of roller 222 into cam recess 226, whereupon the drive for the conveyor bands will be disconnected and they will come to rest in the manner described. When the jam is corrected, switch plunger 244 is again depressed by lever 242 and the solenoid circuitry is conditioned by switch 246 for energization during the next revolution of cam recess past follower 222.

It will be noted in passing that feed table 78 is provided with a backstop 248 and a lateral extension 250 to accommodate long workpieces, the extension also having a rounded lip 252 aligned with lip 228 on the main part of the work table. Extension 250 also has a backstop element 254 aligned with backstop 248.

Downstream from the feeding table is a permanent magnet 256 mounted between the conveyor bands (FIGS. 2 and 4) which holds the passing workpieces firmly down into receptacles 66. A second sensing device 258 is provided for sensing the presence or absence of a workpiece in each passing pair of receptacles. This sensing device comprises a lever 260 (FIGS. 2, 4, and 5) whose upper end 262 projects vertically above the lower extremity of a workpiece W in a passing receptacle 66 under urging of a spring 264 acting on one branch 266 of the lever.

When a workpiece is properly positioned in a passing pair of receptacles, it depresses lever 260 to the dotted line position of FIG. 5 and thereby swings another branch of the lever 268 away from a plunger 270 on a switch 272 and this maintains circuitry for holding solenoid 181 in energized condition. However, when there is no workpiece in a passing pair of receptacles, lever 260 remains in its upward solid line position of FIG. 5, switch plunger 270 remains depressed, and switch 272 conditions circuitry for de-energizing solenoid 181 to bring the conveyor bands to rest as described above. Subsequently upon placing a workpiece in the empty receptacles lever 260 is manipulated to operate switch 272 and re-establish the circuitry for energizing solenoid 181 and the conveyors resume operation upon the next revolution of cam notch 226 past follower 222.

Downstream of sensing device 258 the workpieces pass beneath a hold-down shoe 273 (FIGS. 1, 10 and 11) biased downwardly by a torsion spring 274 on a shaft 275 and then pass beneath a fixed shoe 276 (FIGS. 10 and 11) to a detent notch 277 therein aligned with feeder 82 which feeds fittings F onto the projecting ends 84 of the workpieces. While the conveyor bands are at rest at this station, an air cylinder 288 is actuated by suitable circuitry (not shown) to elevate a slide 290 and raise a jaw 292 from the FIGS. 10 and 11 position to the FIG. 6 position wherein it clamps the workpiece against detent 277 to hold it in place while a fitting F is assembled on end 84. Jaw 292 is mounted on a column 294 having a slidable engagement with slide 290 and being supported by a spring 296 so that slide 290 can ascend a distance greater than that necessary for clamping jaw 292 against the workpiece to facilitate elevating forks 86, 87 at the next station as described below.

Fittings F are supplied from a hopper 298 through a tube 300 to a hollow-ended transfer lever 302 pivotally mounted at 304. The lever has a shoulder 306 engaged by a plunger 308 actuated by a solenoid 310 to swing the lever for aligning a fitting F with a composite piston rod 312 on a hollow piston 314 contained in a pneumatic cylinder 316 furnished with air through a conduit 318 through circuitry (not shown) coordinated to advance the piston when a workpiece is clamped in alignment therewith by jaw 292.

The piston rod includes a pin 320 slidably contained within a sleeve 322. A clearance 324 is provided between the pin and sleeve to form a passageway for compressed air and this passageway is closed by a tapered head 326 on the pin engaged against a complementary valve seat 328 on the sleeve under the action of a coil spring 330.

In the fitting-assembling stroke, pin 320 and sleeve 322 initially advance together. The end of the pin probes within the fitting to support it, and the end of the sleeve pushes the fitting out of transfer lever 302 over the projecting end 84 of the workpiece. When the pin end engages the end of the workpiece, its motion is arrested and the sleeve continues to advance thereby unseating valve member 326 from its seat 328 and admitting a blast of air through passageway 324 which blows the fitting represented in FIG. 6 against conveyor band 62. When air is exhausted from cylinder 316, piston 314 and the composite piston rod are retracted by a coil spring 332. Air cylinder 288 then retracts jaw 292 downwardly to release the workpiece.

Figure 10:
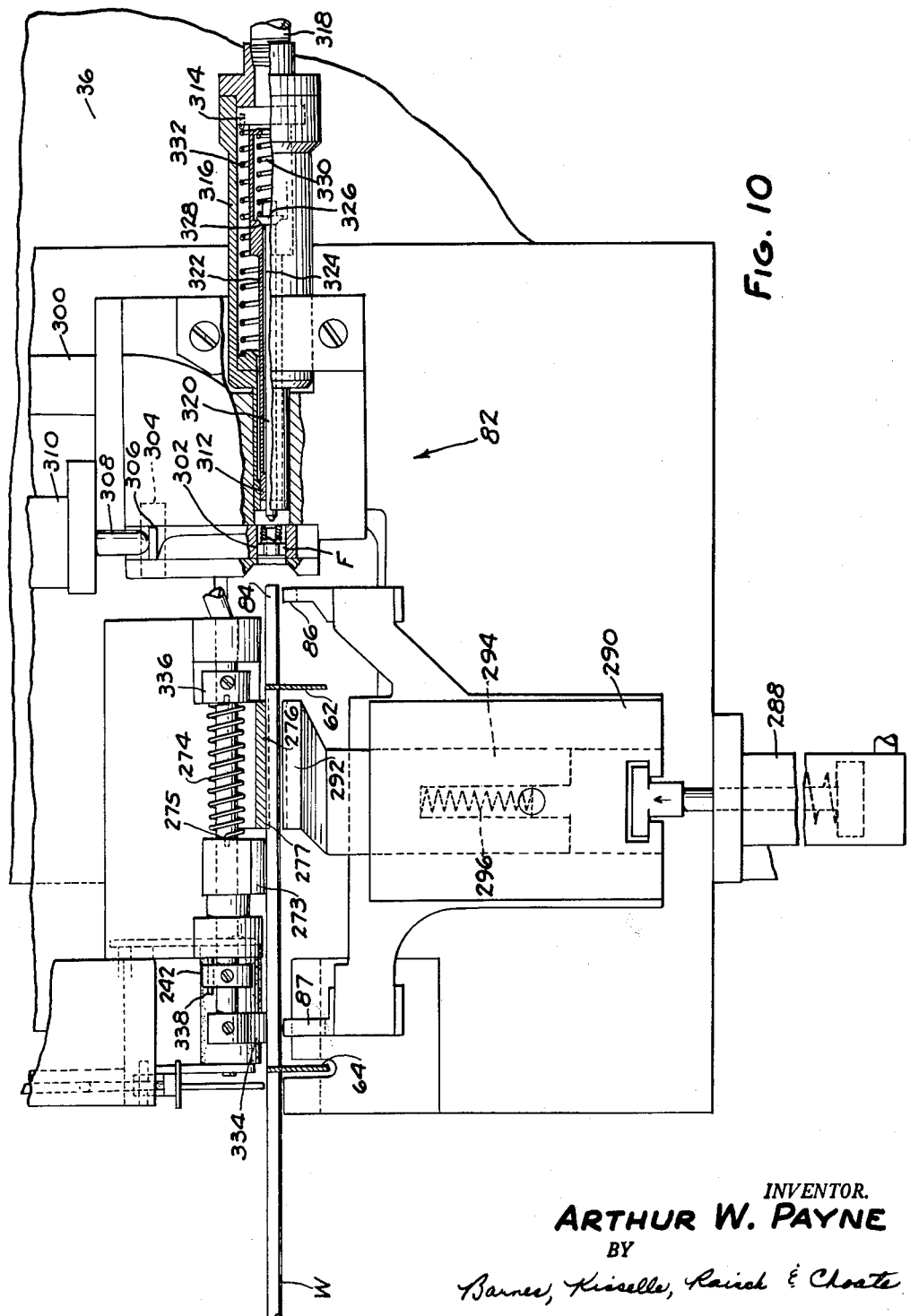
FIG. 10 is a view taken partly in vertical section showing the apparatus for assembling the fitting on a workpiece.
Figure 11:
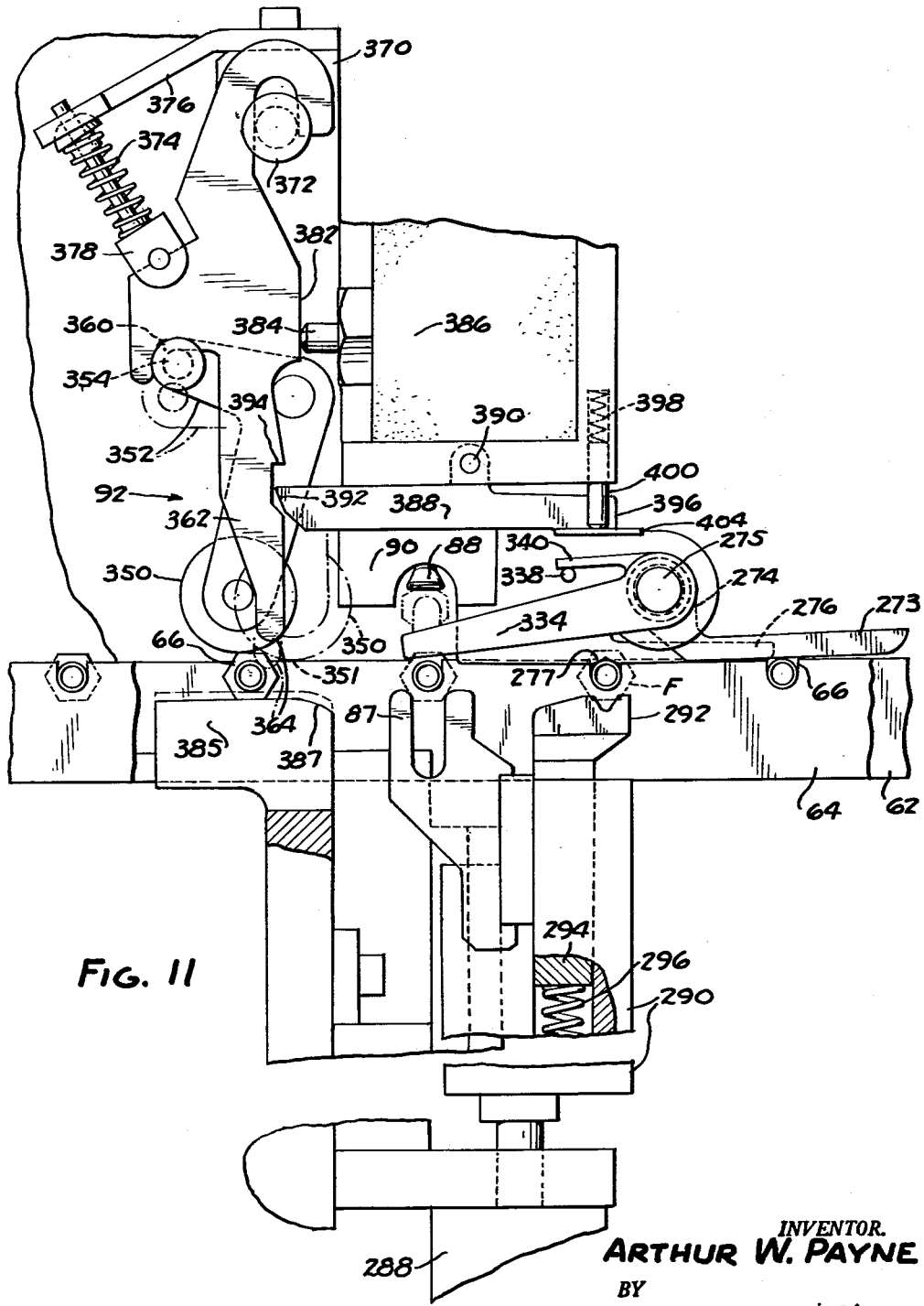
FIG. 11 is a fragmentary front elevational view of the press in the vicinity of the fitting assembler, repositioner, and a sensing mechanism.

In the next cycle of advancement the conveyor bands carry the workpiece beneath hood 90 containing air nozzle 88 (FIGS. 1, 7, and 11). Air cylinder 288 is again actuated to elevate slide 290 which carries forks 86 and 87 upwardly to elevate the workpiece out of receptacles 66 in the conveyor bands. A jet of air is directed at fitting F through nozzle 88 and blows the fitting to the left as FIGS. 7 and 10 are viewed to a position against or adjacent fork 87, as illustrated in FIG. 7. Fork 87 provides a stop which limits movement of the fitting.

A hold-down lever 334 on shaft 275 is biased downwardly by torsion spring 274 through a collar 336 for containing a workpiece within fork 87. Downward swinging of the hold-down lever is limited by a stop-pin 338 engaged by a projection 340 on a collar 342 on shaft 275. After the fitting has been blown to the FIG. 7 position, air cylinder 288 again retracts slide 290 downwardly and forks 86, 87 reposition the workpiece within receptacles 66.

In the next movement of the conveyor bands, the workpiece is transported to sensing device 92 (FIGS. 11, 12, and 13) which detects whether or not a fitting F is on the workpiece at a proper location so that it will clear die jaws 42, 44 at the work performing stations. This sensing device detects a failure or malfunctioning of either the fitting-assembling mechanism 82 or the air blast transfer device at the preceding station.

Sensing device 92 includes a bell crank 344 having a fixed pivot 346 with a downwardly-extending arm 348 having roller 350 mounted at its lower end. The bottom extremity 351 of the roller is disposed above the upper extremity of passing workpieces W so that if there is no fitting F on a passing workpiece the roller will remain uninfluenced. The crank has a horizontally extending arm 352 carrying a stud 354 having a head 356. Arm 352 and head 356 supportingly embrace opposite sides of a vertically reciprocable plate 358 having a notch 360 within which pin 354 is disposed. Plate 358 has a downwardly extending finger 362 whose lower extremity 364 is disposed below the upper extremities of passing workpieces in receptacles 66.

Figures 12, 13:
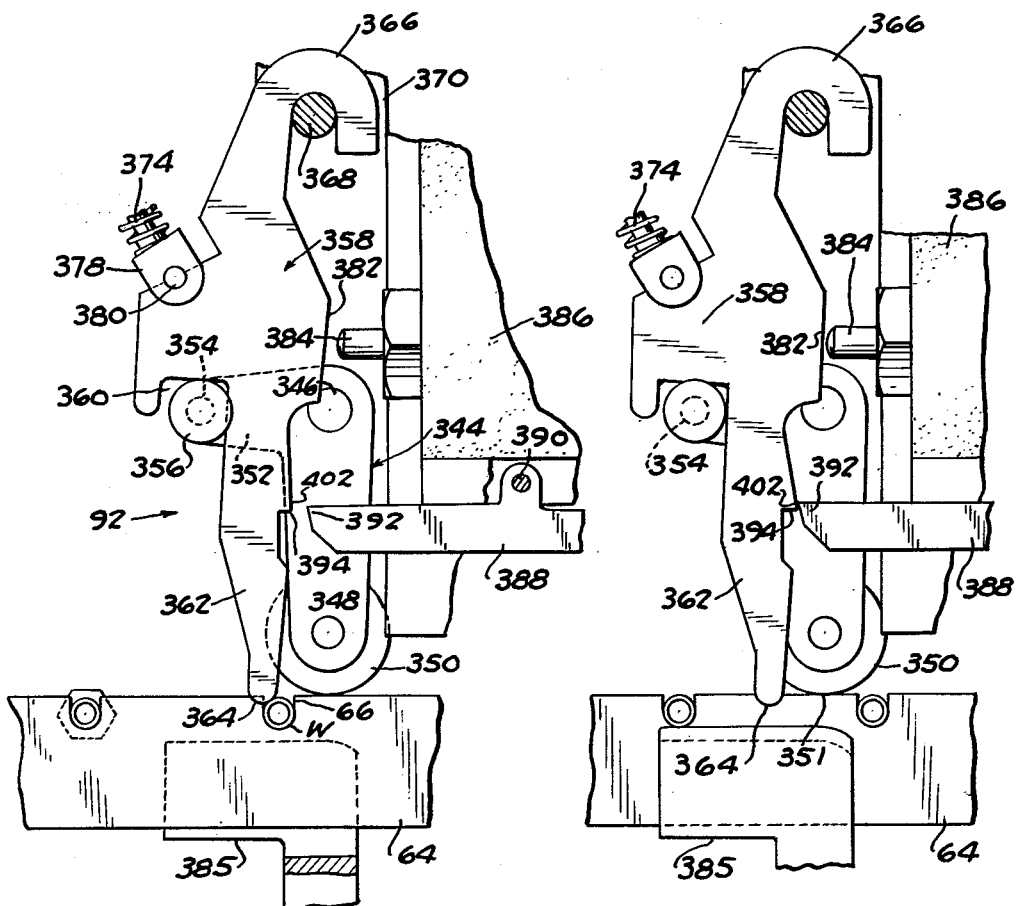
FIG. 12 is a generally front elevational view showing the condition of the sensing mechanism in the absence of a fitting from its proper location.
FIG. 13 is a view similar to FIG. 12 with the parts shown at rest after detecting the absence of a fitting.

Plate 358 has an upper hooked end 366 slidably engaged over a pin 368 on a support 370. Support 370 and a head 372 on the pin embrace opposite sides of the plate to guide its vertical movement. The plate is biased downwardly and to the right as FIGS. 11–13 are viewed by a spring 374 compressed against an arm 376 on support 370 and acting against a clevis 378 pivoted on the plate at 380. An edge 382 of the plate is yieldably held against a plunger 384 on a switch 386.

In the dotted line positions of roller 350 and finger 362 shown in FIG. 11 wherein neither of them are engaged by a fitting or workpiece, their lower extremities 351 and 364 respectively are both positioned to the right of the receptacle 66 at the sensing station and the lower roller extremity 351 is positioned to the right or upstream of finger extremity 364. A fitting support 385 is positioned vertically beneath roller 350 a distance less than the diameter of fitting F, and this support has a bevel 387 at its upstream edge to rock approaching fittings (where they have polygonal shapes) so that their flat sides will engage against the top of the support.

A reset lever 388 is pivoted on support 370 at 390 and has an end 392 which is disposed beneath a shoulder 394 on plate 358 while the plate is in the vertical position of FIG. 11. The opposite end portion 396 of the reset lever is biased downwardly by a spring 398 through a pin 400. Plate 358 has a side edge 402 adjacent shoulder 394 engaged by lever end 392 to hold it out of engagement with switch plunger 384 after device 92 has detected the absence of a fitting F from its proper location. The reset lever has a finger hold 404 to facilitate resetting the sensing device.

In FIG. 11 receptacles 66 are shown at locations where they are successively positioned by single cycles of advancement of the bands. If a fitting F is properly positioned on a workpiece as it approaches sensing device 92, it will pass between support 385 and roller 350 before the conveyor bands reach the end of their cycle of movement. During the terminal part of this movement the fitting rocks roller 350 and crank 344 clockwise from the dotted line to the solid line position of FIG. 11. Crank arm 352 through interengagement of pin 354 with the top of notch 360 elevates plate 358 against the action of spring 374 to raise lower extremity 364 of finger 362 to the solid line position of FIG. 11 which is above the level of the workpiece to which the fitting is assembled. The workpiece thus passes beneath the finger without influencing it and plate 358 remains in its generally vertical position of FIG. 11 with its side 382 holding switch plunger 384 depressed.

Upon the next cycle of conveyor movement the fitting passes from beneath roller 350 which returns downwardly to its dotted line position of FIG. 11 under the action of spring 374, and this happens after the workpiece itself has passed beyond finger 362. Thus so long as there is a fitting properly positioned on each passing workpiece, plate 358 is merely bobbed up and down vertically, switch plunger 384 remains depressed, and switch 386 through suitable circuitry (not shown) maintains solenoid 181 in energized condition so that pawl 130 in each reciprocation continues to advance the conveyor bands one step.

In the event that no fitting F is properly positioned on a workpiece W as it approaches sensing device 92, roller 350 remains in its downward position and does not elevate plate 358 so that lower end 364 of finger 362 remains in position for engagement by workpiece W. In the terminal movement of the conveyor bands, the workpiece swings finger 362 from the broken line position of FIG. 11 to the position of FIG. 12 about pivot 368 against the action of spring 374 thereby disengaging side surface 382 from switch plunger 384 to trip switch 386. This conditions de-energizing circuitry for solenoid 181.

Then upon upward movement of pawl arm 32 roller 222 drops into cam notch 226 to actuate the de-energizing circuitry so that spring 76 retracts pawl 130 to the right in the manner described above. Pawl 188 turns ratchet wheel 122 one-half stroke to advance the conveyor bands one-half step in the manner described above, and the system comes to rest in the FIG. 12 position.

While finger 362 is in the vertical position of FIG. 11 shoulder 394 remains in vertical alignment with end 392 of reset lever 388, and this shoulder engages the top of the lever with each downward movement to the dotted line position. The lever pivots downwardly against the action of spring 398. When finger 362 is swung to the left by a workpiece as in FIG. 12 shoulder 394 is displaced to the left from end 392 of the reset lever; and when the workpiece passes, the finger is retracted to the right by spring 374, but side 382 is restrained from engagement with switch plunger 384 by engagement of surface 402 on the finger with the end face of the reset lever as shown in FIG. 13. This prevents conditioning of the energizing circuitry for solenoid 181, and the conveyor bands remain at rest.

After the malfunction has been corrected, finger hold 404 on the reset lever is elevated against spring 398 to depress the opposite end 392 of the lever and shoulder 394 snaps over the end of the lever under the action of spring 374 so that surface 386 depresses plunger 384 to trip switch 386 which conditions the energizing circuitry for solenoid 181 for actuation by switch 218 when roller 222 falls into cam notch 226 during the next upward stroke of pawl arm 132. The solenoid is thereby energized to swing pawl 130 to the left as FIG. 21 is viewed for re-engagement with ratchet wheel 122 to resume intermittent advancement of the conveyor bands.

Figure 9:
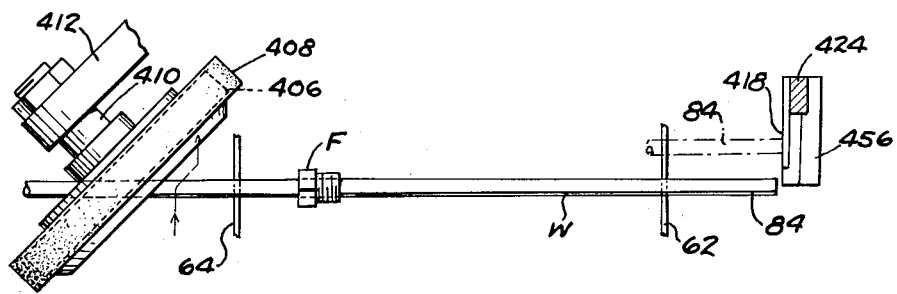
FIG. 9 is a diagrammatic plan view at a subsequent station at which the first work is performed on the workpiece.
Figure 18:
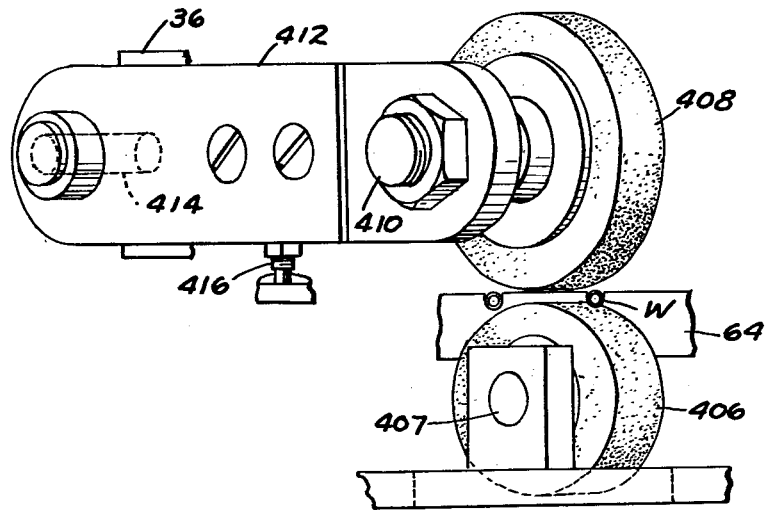
FIG. 18 is a fragmentary front elevation illustrating skewed rolls for longitudinally positioning the workpieces against a stop.
Figure 19:
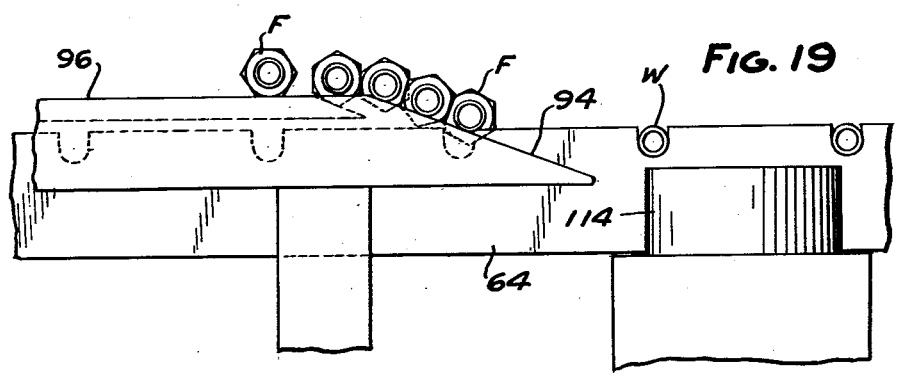
FIG. 19 is a fragmentary front elevation taken downstream of the working components of the press.
Figure 20:
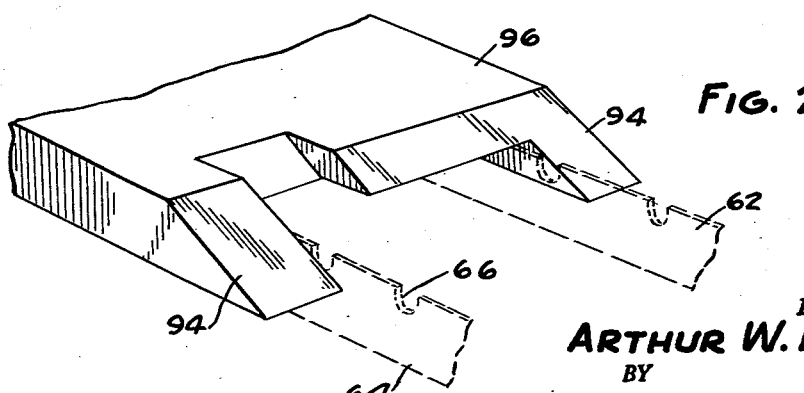
FIG. 20 is a perspective view of the arrangement shown in FIG. 19.

The conveyor bands next advance a workpiece to the first work performing station S' and en route pass between a pair of skewed rollers, one of which 406 is mounted on a fixed axle 407 (FIG. 18) and the other of which 408 is mounted on a stub axle 410 (FIGS. 9 and 18) supported by an arm 412 pivotally mounted on the press frame at 414. An adjustable stop 416 (FIG. 18) is provided so that upper roll 408 can be adjusted to bear gravitationally against a passing workpiece and urge it inwardly (FIG. 9) so that its free end 84 will engage against a stop 418 in horizontal alignment with tool T' and die-jaw recesses 420 and 422 in jaw-dies 42 and 44 respectively (FIG. 14).

Stop 418 is supported by a floatingly mounted vertically reciprocable bar 424 having at its upper end a pair of rollers 426 engaged in tracks 428 in T-block 38. Bar 424 has a lateral projection 430 carrying a pin 432 pivotally engaged by a supporting hook 434 connected to a rod 436 extending through an opening 438 in T-block 38 to the exterior of the press and having a flanged cap 440 threaded onto its outer end. The flange 442 on the cap is supportingly engaged by a compressed spring 444 reacting against a flange 446 on a rocker 448 through which rod 36 slidably projects and having a rounded surface 450 rockably engaged within a complementary recess in T-block 38.

The lower end 452 of bar 424 has a screw 454 which engages die-jaw 44 for adjustably positioning stop 418. The lower end of the bar also has a cam surface 456 positioned for engagement by a complementary surface 458 on tool carrier 46 so that when the tool carrier advances in its work stroke to the left as FIGS. 14 and 16 are viewed bar 424 and stop 418 are cammed downwardly out of the path of tool T' against the action of spring 444. When the tool carrier is retracted after the work stroke, stop 418 is returned upwardly for positioning a successive workpiece by spring 444.

Prior to advancement of the tool carrier in the work stroke, die-jaw 44 is elevated by a mechanism disclosed in my said co-pending application so that workpiece W is elevated into alignment with tool T' and clamped between recesses 420, 422. In the apparatus illustrated, tool T' then performs the first tube flaring operation represented in FIG. 16 and then retracts. Jaw 44 then retracts downwardly and the workpiece is stripped from within to recess 422 by engagement of the workpiece with the bottom of notch 66 in conveyor band 62. Upper die-jaw 42 is provided with a stripping pin 460 biased downwardly by a spring 462 (FIG. 14).

In the next cycle the conveyor bands carry the workpiece to the second work performing station S" in which jaw 44 again elevates the workpiece into alignment with tool T" and clamps the workpiece between recesses 464 and 466 while tool T" performs the second flaring operation represented in FIG. 17. Subsequently die-jaw 44 again retracts downwardly and the workpiece is stripped from within the latter recesses by conveyor notch 66 and another stripping pin 460 (FIG. 25) which projects into recess 464.

The two work performing stations S' and S" are spaced apart by one full increment of movement of the conveyor bands. As long as the motor means for the conveyor bands is in operation, a workpiece progresses directly from station S' to station S". In the event of a failure or malfunctioning of any of the upstream sensing devices, i.e. at the feed table, at 258, or at 92, the workpiece then at station S' will be advanced half of the distance to station S" rather than the whole distance. The position of the conveyor bands and workpieces relative to die-jaws 42—44 after the drive for the conveyor bands has been disconnected is represented in FIG. 25.

The workpiece and fitting which have just left station S" are out of range of the die-jaws to the left. The workpiece and fitting which have just left station S' are about half way between S' and S" at a region where die-jaw 44 has a recess 468 which clears the intermediate workpiece and fitting as die-jaw 44 continues to reciprocate. The succeeding workpiece and fitting stop clear of the die-jaws to the right as shown. Thus even though die-jaw 44 continues to reciprocate the various workpieces and fittings remain clear of it so that neither they nor the die-jaws are damaged.

Figure 25:
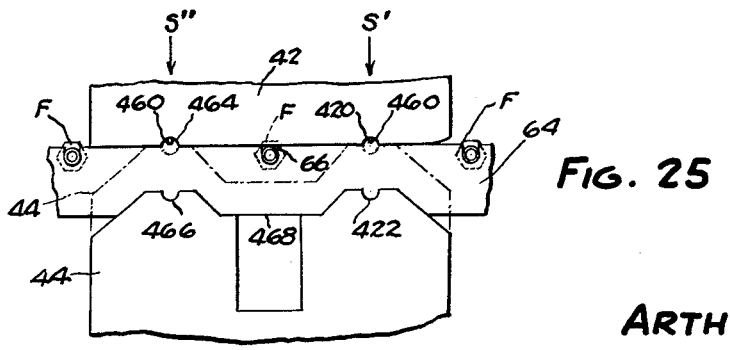
FIG. 25 is a fragmentary front elevational view illustrating the relative position of the conveyor at rest after a feeding malfunction has been detected.

Reviewing, when solenoid 181 is de-energized to swing pawl arm 132 out of engagement with the ratchet wheel in its upward stroke, pawl 188 then advances the ratchet wheel one-half step to advance the conveyor bands also one-half step to bring them to rest at the positions shown in FIGS. 13 and 25. The bands will also be midway between the positions shown in FIGS. 2 and 11. When the failure or malfunction is subsequently corrected, pawl arm 132 during its next upward stroke is again swung to the left for engaging the ratchet wheel in the manner described and on its first subsequent downward stroke, pawl 130 completes the half step started by pawl 188 to advance the two right-hand workpieces and fittings shown in FIG. 25 respectively to stations S" and S'. In subsequent cycles fittings and workpieces are carried past the die-jaws and tools in succession as described.

After emerging from work station S" the completed workpieces with their fittings F are carried to discharge forks 94 which ramp the workpieces upwardly out of receptacle 66 onto discharge table 96, and the bands then converge and return to propelling wheel 170 in the manner described.

I claim:
1. A conveyor for elongate workpieces, such as lengths of tubing or the like, comprising, means forming a pair of endless flexible bands, each having means providing along its length a series of spaced-apart workpiece carrying receptacles, means mounting said bands for longitudinal movement in closed circuits, the portions of the two bands in portions of said circuits being spaced apart in generally parallel relation and the receptacles in said band portions being disposed in paired alignment for workpiece reception, motor driven means operable successively to engage within the receptacles of said bands, move longitudinally thereof, and retract from said receptacles to advance said bands substantially in unison so that said paired receptacles substantially translate a workpiece through said portions of said circuits.

2. A conveyor for elongate workpieces, such as lengths of tubing or the like, comprising, means forming a pair of endless flexible bands, each having means providing along its length a series of spaced-apart workpiece carrying receptacles, means mounting said bands for longitudinal movement in closed circuits, the portions of the two bands in portions of said circuits being spaced apart in generally parallel relation and the receptacles in said band portions being disposed in paired alignment in a direction substantially perpendicular to said band portions for receiving workpieces oriented in said direction, motor driven means operable successively to engage within the receptacles of said bands, move longitudinally thereof, and retract from said receptacles to advance said bands substantially in unison, so that said paired receptacles substantially translate a workpiece through said portions of said circuits.

3. A conveyor for elongate workpieces, such as lengths of tubing or the like, comprising, means forming a pair of endless flexible bands, each having means providing along its length a series of spaced-apart workpiece carrying receptacles, means mounting said bands for longitudinal movement in closed circuits, the portions of the two bands in portions of said circuits being spaced apart in generally parallel relation and the receptacles in said band portions being disposed in paired alignment for workpiece reception, motor means operable successively to engage within the receptacles of said bands, move longitudinally, and retract from the receptacles to advance said bands, said motor means cooperating with the engaged receptacles to maintain relative longitudinal alignment of said bands during advancement thereof so that said paired receptacles are retained in their paired relation during advancement thereof for substantially translating a workpiece through said portions of said circuits.

4. A conveyor for elongate workpieces, such as lengths of tubing or the like, comprising, means forming a pair of endless flexible bands, each having means providing along its length a series of spaced-apart workpiece carrying receptacles, means mounting said bands for longitudinal movement in closed circuits, the portions of the two bands in first portions of said circuits being spaced apart in generally parallel relation and the receptacles in said band portions being disposed in paired alignment for workpiece reception, the portions of said two bands in second portions of said circuits having receptacles in paired alignment, motor driven means engageable within successive latter said aligned pairs of receptacles for advancing said bands in unison so that the first said paired receptacles substantially translate a workpiece through said first portions of said circuits.

5. A conveyor for elongate workpieces, such as lengths of tubing or the like, comprising, means forming a pair of endless flexible bands, each having means providing along its length a series of spaced-apart workpiece carrying receptacles, means mounting said bands for longitudinal movement in closed circuits, said circuits having first portions and second portions wherein the receptacles are in paired alignment, said bands in said first circuit portions being spaced apart in generally parallel relation for supporting a workpiece at spaced locations, said bands at said second circuit portions being disposed closely adjacent, motor driven means including pin means successively engageable within aligned receptacles at said second circuit portions for advancing said bands substantially in unison so that the paired workpiece carrying receptacles substantially translate a workpiece through said first circuit portions.

6. A conveyor for elongate workpieces, such as lengths of tubing or the like, comprising, means forming a pair of endless flexible bands, each having means providing along its length a series of spaced-apart workpiece carrying receptacles, means mounting said bands for longitudinal movement in closed circuits, said circuits having first portions and second portions wherein the receptacles are in aligned relation, the portions of the two bands in said first portions being spaced apart in generally parallel relation so that the receptacles therein support a workpiece in spaced-apart positions, said bands at said second circuit portions being disposed relatively closely adjacent, motor driven means including a substantially rigid pin insertable into successive relatively closely adjacent aligned receptacles for advancing said bands and maintaining relative longitudinal alignment thereof so that the paired receptacles at said first circuit portions substantially translate a workpiece therethrough.

7. The combination defined in claim 6 wherein said bands have side faces which are engaged at said second circuit portions.

8. A conveyor for elongate workpieces, such as lengths of tubing or the like, comprising, a pair of endless flexible bands of form-retaining material such as metal or the like, each band having an exposed edge provided along its length with a series of spaced-apart notches, means mounting said bands for longitudinal movement in closed circuits, said circuits having two portions wherein the notches are in paired alignment, the bands in one circuit portion being spaced apart in generally parallel relation so that the notches thereat received and support a workpiece at spaced apart locations, the bands at the other circuit portions being relatively closely adjacent, motor driven means including common pin means insertable into the pairs of notches at said other circuit portions for advancing said bands, said common pin means being substantially rigid to maintain the relative longitudinal position of said bands so that said bands at said first circuit portions substantially translate a workpiece engaged within their paired receptacles.

9. A conveyor for elongate workpieces, such as lengths of tubing or the like, comprising, means forming a pair of endless flexible bands, each having means providing along its length a series of spaced-apart workpiece carrying receptacles, means mounting said bands for longitudinal movement in closed circuits, said mounting means including a plurality of rollers between which said bands pass, the rollers engaging side faces of said bands and determining the respective shapes of the circuits of said bands, said circuits having portions in which the bands are spaced apart in generally parallel relation with their respective receptacles in paired alignment for workpiece reception, motor driven means operable successively to engage within receptacles of said bands, move longitudinally thereof, and retract from said receptacles to advance said bands substantially in unison so that said paired receptacles substantially translate a workpiece through said circuit portions.

10. A conveyor for elongate workpieces, such as lengths of tubing or the like, comprising, means forming a pair of endless flexible bands, each having means providing along its length a series of spaced-apart workpiece carrying receptacles, means mounting said bands for longitudinal movement in closed circuits, said circuits having portions wherein the bands are spaced apart in generally parallel relation and the receptacles in said bands are disposed in paired alignment for workpiece reception, a motor driven wheel having a circumferential series of projections engageable within receptacles in said bands, said projections being operative upon turning of said wheel to advance said bands substantially in unison so that said paired receptacles substantially translate a workpiece through said portions of said circuits.

11. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming a pair of endless flexible bands, each having means providing along its length a series of spaced-apart workpiece carrying receptacles, means mounting said bands for longitudinal movement in closed circuits, said circuits having portions wherein said bands are spaced apart in generally parallel relation and the receptacles are disposed in paired alignment for workpiece reception, said bands at said circuit portions passing adjacent said jaw means with the paired receptacles positioned along a line passing between said jaw means so that said jaw means are engageable with a workpiece carried by the paired receptacles, drive means for said bands including a continuously motor reciprocated element and means operable under the influence of said element to enter successive receptacles in said bands, move longitudinally of said bands and retract from said receptacles to advance said bands intermittently and substantially in unison, and means operable to synchronize the movement of said reciprocating element to advance said bands when said jaw means and tool means are retracted from a workpiece whereby to feed a succession of workpieces to said work-performing mechanism.

12. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming a pair of endless flexible bands mounted for movement in closed circuits and having means providing along their lengths a series of notches forming workpiece carrying receptacles, said bands in portions of said circuits straddling portions of said jaw means in generally parallel relation with their receptacles in paired alignment along a line passing between said jaw means for carrying a workpiece between said jaw means, means upstream of said jaw means operable to deposit in paired receptacles a workpiece having a relatively large diameter element at a location predetermined so that it follows a path clear of said jaw means, positive and negative sensing means upstream of said jaw means respectively sensitive to the presence and absence of an element in said path on each passing workpiece, motor driven propelling means engageable in successive receptacles for advancing said bands intermittently in alternate synchronism to operation of said jaw means and tool means, circuitry operable responsive to operation of said positive and negative sensing means respectively to maintain and deactuate the motor drive for said propelling means, and motor means operable through said propelling means upon deactuation of said motor drive to advance said bands in phase with their said intermittent advancement a distance so predetermined that successive receptacles and the workpieces carried thereby come to rest outside of the effective working regions of said jaw means and tool means.

13. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming a pair of endless flexible bands mounted for movement in closed circuits and having means providing along their lengths a series of notches forming workpiece carrying receptacles, said bands in portions of said circuits straddling portions of said jaw means in generally parallel relation with their receptacles in paired alignment along a line passing between said jaw means for carrying a workpiece between said jaw means, means upstream of said jaw means operable to deposit in paired receptacles a workpiece having a relatively large diameter element at a location predetermined so that it follows a path clear of said jaw means, positive and negative sensing means upstream of said jaw means respectively sensitive to the presence and absence of an element in said path on each passing workpiece, band-propelling means engageable in successive receptacles, first motor means operable through said propelling means to advance said bands a distance substantially equal to the distance between successive receptacles intermittently in alternate synchronism to operation of said jaw and tool means, circuitry operable responsive to operation of said positive and negative means respectively to maintain and disconnect the driving connection between said first motor means and propelling means, and second motor means operable through said propelling means when said first motor means is disconnected to advance said bands in phase with their said intermittent advancement a fraction of said distance between successive receptacles, said fraction being predetermined so that successive receptacles and the workpieces carried thereby come to rest on opposite sides of and outside of the effective working regions of said jaw and tool means.

14. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming a pair of endless flexible bands mounted for movement in closed circuits and having means providing along their lengths a series of notches forming workpiece carrying receptacles, said bands in portions of said circuits straddling portions of said jaw means in generally parallel relation with their receptacles in paired alignment along a line passing between said jaw means for carrying a workpiece between said jaw means, means upstream of said jaw means operable to deposit in paired receptacles a workpiece having a relatively large diameter element at a location predetermined so that it follows a path clear of said jaw means, positive and negative sensing means upstream of said jaw means respectively sensitive to the presence and absence of an element in said path on each passing workpiece, band propelling means engageable in successive receptacles, first and second motor means, each having a disconnectable driving connection with said propelling means and each having continually intermittent movement in alternate synchronism to that of said jaw and tool means, means providing a lag between said driving connections so that when said driving connection for said first motor means is connected said driving means for said second motor means is disconnected, said first motor means being operable through said propelling means to advance said bands a distance substantially equal to the distance between successive receptacles during each cycle of movement thereof, circuitry operable responsive to operation of said positive and negative sensing means respectively to maintain and disconnect the driving connection between said first motor means and propelling means, said second motor means, when said driving connection for said first motor means is disconnected, being operative to take up said lag for connecting its said driving connection, said second motor means while its said driving connection is being operable through said propelling means to advance said bands in phase with their said intermittent movement a fraction of said distance between successive receptacles, said fraction being so determined that successive receptacles and the workpieces carried thereby come to rest on opposite sides of and outside of the effective working regions of said jaw and tool means.

15. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming a pair of endless flexible bands mounted for movement in closed circuits and having means providing along their lengths a series of notches forming workpiece carrying receptacles, said bands in portions of said circuits straddling portions of said jaw means in generally parallel relation with their receptacles in paired alignment along a line passing between said jaw means for carrying a workpiece between said jaw means, means upstream of said jaw means operable to deposit in paired receptacles a workpiece having a relatively large diameter element at a location predetermined so that it follows a path clear of said jaw means, positive and negative sensing means upstream of said jaw means respectively sensitive to the presence and absence of an element in said path on each passing workpiece, propelling means for said bands including means engageable in successive receptacles and being movable intermittently in alternate synchronism to operation of said jaw and tool means by ratchet means and two continually reciprocated pawls, one pawl being operative in each cycle to advance said bands a distance substantially equal to the distance between their successive receptacles, the other pawl being disposed to provide a lag behind said one pawl, circuitry responsive to operation of said positive and negative sensing means respectively to maintain and disconnect the connection between said one pawl and ratchet means, said other pawl when said one pawl is disconnected being operative to take up said lag and operatively engage said ratchet means, said other pawl when connected with said ratchet means being operable to advance said bands a fraction of said distance between successive receptacles, said fraction being determined so that successive receptacles and the workpieces carried thereby come to rest on opposite sides of and outside of the effective working regions of said jaw means and tool means.

16. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming a pair of endless flexible bands mounted for movement in closed circuits and having means providing along their lengths a series of notches forming workpiece carrying receptacles, said bands in portions of said circuits straddling portions of said jaw means in generally parallel relation with their receptacles in paired alignment along a line passing between said jaw means for carrying a workpiece between said jaw means, means upstream of said jaw means operable to deposit in paired receptacles a workpiece having a relatively large diameter element at a location predetermined so that it follows a path clear of said jaw means, positive and negative sensing means upstream of said jaw means respectively sensitive to the presence and absence of an element in said path on each passing workpiece, propelling means for said bands including means engageable in successive receptacles and being movable intermittently in alternate synchronism to operation of said jaw and tool means by ratchet means and two continually reciprocated pawls, one pawl being operative in each cycle to advance said bands a distance substantially equal to the distance between their successive receptacles, the other pawl being disposed to provide a lag behind said one pawl, circuitry responsive to operation of said positive and negative sensing means respectively to maintain and disconnect the connection between said one pawl and ratchet means, said other pawl when said one pawl is disconnected being operative to take up said lag and operatively engage said ratchet means, said other pawl when connected with said ratchet means being operable to advance said bands a fraction of said distance between successive receptacles, said fraction being determined so that successive receptacles and the workpieces carried thereby come to rest on opposite sides of and outside of the effective working regions of said jaw means and tool means, said other pawl having a stroke less than the distance between adjacent teeth of said ratchet means so that upon continued reciprocation thereof after advancing said bands, said other pawl remains free of engagement with succeeding ratchet teeth to facilitate continued reciprocation of said other pawl while said bands remain at rest.

17. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming a pair of endless flexible bands mounted for movement in closed circuits and having means providing along their lengths a series of notches forming workpiece carrying receptacles, said bands in portions of said circuits straddling portions of said jaw means in generally parallel relation with their receptacles in paired alignment along a line passing between said jaw means for carrying a workpiece between said jaw means, means upstream of said jaw means operable to deposit in paired receptacles a workpiece having a relatively large diameter element at a location predetermined so that it follows a path clear of said jaw means, positive and negative sensing means upstream of said jaw means respectively sensitive to the presence and absence of an element in said path on each passing workpiece, band propelling means engageable in successive receptacles, a ratchet wheel having a driving connection to said propelling means, a first pawl mounted for movement toward and away from said ratchet wheel for operative engagement and disengagement therewith, a second pawl continuously engaged against said ratchet wheel, motor means continually reciprocating said pawls, said first pawl when in operative engagement with said ratchet wheel being operable in each cycle to advance said bands a distance substantially equal to the distance between their successive receptacles, said second pawl being positioned to provide a lag behind said first pawl, circuitry operable responsive to operation of said positive and negative sensing means respectively to maintain said first pawl in engaged relation with said ratchet wheel and to move said first pawl to disengaged relation, said second pawl, when said first pawl is disengaged, being operable to take up said lag, engage said ratchet wheel, and advance said bands in phase with first-pawl-induced advancement thereof a fraction of said distance between successive receptacles, said fraction being so determined that successive receptacles and the workpieces carried thereby come to rest on opposite sides of and outside of the effective working regions of said jaw and tool means.

18. The combination defined in claim 17 wherein said propelling means comprises, a wheel drivingly connected to said ratchet wheel, said propelling wheel having a plurality of circumferentially spaced projections which engage within successive receptacles at said bands for propelling said bands.

19. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming an endless conveyor mounted for movement in a closed circuit and having means providing along its length a series of receptacles positioned to carry a succession of workpieces between said jaw means, means upstream of said jaw means operable to deposit in successive receptacles a workpiece having a relatively large diameter element at a location predetermined so that it follows a path clear of said jaw means, positive and negative sensing means upstream of said jaw means respectively sensitive to the presence and absence of an element in said path on said passing workpiece, motor driven propelling means engageable in said receptacles for advancing said conveyor intermittently in alternate synchronism to operation of said jaw and tool means, circuitry operable responsive to operation of said positive and negative sensing means respectively to maintain and deactuate the motor drive for said propelling means, means operable upon deactuation of said motor drive to advance said conveyor in phase with its said intermittent advancement a distance so predetermined that successive receptacles and the workpieces carried thereby come to rest outside of the effective working regions of said jaw and tool means.

20. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming a workpiece carrying conveyor movably mounted for carrying a succession of workpieces between said jaw means, means upstream of said jaw means operable to deposit on said conveyor a succession of workpieces having a relatively large diameter element at a location predetermined so that it follows a path clear of said jaw means, positive and negative sensing means upstream of said jaw means respectively sensitive to the presence and absence of an element in said path on each passing workpiece, motor driven propelling means operative to advance said conveyor inetrmittently in alternate synchronism to operation of said jaw and tool means, circuitry operable responsive to operation of said positive and negative sensing means respectively to maintain and deactuate the motor drive for said propelling means, and motor means operable upon deactuation of said motor drive to advance said conveyor in phase with its said intermittent advancement a distance so predetermined that successive workpieces come to rest outside of the effective working regions of said jaw and tool means.

21. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming a workpiece carrying conveyor movably mounted for carrying a succession of workpieces between said jaw means, motor driven propelling means operable to advance said conveyor intermittently in alternate synchronism to operation of said jaw and tool means, means upstream of said jaw means operable to deposit on said conveyor a succession of workpieces each having a relatively large diameter element at a location predetermined so that it follows a path clear of said jaw means, means providing first and second detectors operable respectively to detect the presence and absence in said path of an element on each workpiece passing a location upstream of said jaw means, said first detector being operative to inactivate said second detector responsive to detecting the presence of an element on a passing workpiece, circuitry operably interconnecting said second detector and the motor drive for said propelling means, said second detector being operable responsive to detecting the absence of an element on a passing workpiece to condition said circuitry for inactivating said propelling means, and means operable upon inactivation of said propelling means to advance said conveyor a distance so predetermined that successive workpieces carried by said conveyor come to rest outside of the effective working regions of said jaw and tool means.

22. Apparatus for performing work on elongate workpieces, such as lengths of tubing or the like, comprising, a work-performing mechanism having jaw means and tool means continuously motor reciprocated and syn-chronized to successively clamp a workpiece, advance the tool means in a work stroke, retract the tool means, and release the jaw means, means forming a workpiece carrying conveyor movably mounted for carrying a succession of workpieces between said jaw means, motor driven propelling means operable to advance said conveyor intermittently in alternate synchronism to operation of said jaw and tool means, means upstream of said jaw means operable to deposit on said conveyor a succession of workpieces each having a relatively large diameter element at a location predetermined so that it follows a path clear of said jaw means, means providing first and second detectors positioned in said path upstream of said jaw means, said first detector being operable responsive to engagement by an element on a passing workpiece to inactive said second detector, circuitry operably interconnecting said second detector and the motor drive for said propelling means, said second detector being positioned to engage a portion of a workpiece in said path from which an element is absent, said second detector being operable responsive to detecting the absence of an element on a passing workpiece to actuate said circuitry for inactivating said propelling means, and means operable upon inactivation of said propelling means to advance said conveyor a distance so predetermined that successive workpieces carried by said conveyor come to rest outside of the effective working regions of said jaw and tool means.

23. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming a workpiece carrying conveyor movably mounted for carrying a succession of workpieces between said jaw means, motor driven propelling means operable to advance said conveyor intermittently in alternate synchronism to operation of said jaw and tool means, means upstream of said jaw means operable to deposit on said conveyor a succession of workpieces each having a relatively large diameter element at a location predetermined so that it follows a path clear of said jaw means, means providing first and second detectors positioned in said path upstream of said jaw means, said first detector being positioned for engagement by an element on a passing workpiece and said second detector being positioned for engagement by a portion of a passing workpiece from which an element is absent, said first detector being shiftable responsive to engagement by a passing element and being operable upon element-induced shifting to shift said second detector to a position in which it clears the workpiece, circuitry operably interconnecting said second detector and the motor drive for said propelling means, said second detector being operable responsive to engagement by a portion of a passing workpiece from which an element is absent to actuate said circuitry for inactivating said propelling means, and means operable upon inactivation of propelling means to advance said conveyor a distance so determined that successive workpieces carried by said conveyor come to rest outside of the effective working regions of said jaw and tool means.

24. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming a workpiece carrying conveyor movably mounted for carrying a succession of workpieces between said jaw means, motor driven propelling means operable to advance said conveyor intermittently in alternate synchronism to operation of said jaw and tool means, means upstream of said jaw means operable to deposit on said conveyor a sucession of workpieces each having a relatively large diameter element at a location predetermined so that it follows a path clear of said jaw means, a first detector in the form of a bell crank having one arm positioned in said path for engagement by an element on a passing workpiece upstream of said jaw means, a second detector in the form of a shiftable-pivot lever having an end portion generally adjacent said crank arm positioned in said path for engagement by a portion of a passing workpiece from which an element is absent, said one crank arm being rockable responsive to engagement by an element on a passing workpiece, and the other crank arm of said bell crank being thereby operable to shift said lever relative to its pivot to a position in which it clears the passing workpiece, circuitry including a switch operably interconnecting said second detector and motor drive for said propelling means, said second detector being rockable about its said pivot responsive to engagement by a portion of a passing workpiece from which an element is absent for operating said switch, said circuitry responsive to operation of said switch being operable to inactivate said propelling means, and means operable upon inactivation of said propelling means to advance said conveyor a distance predetermined so that successive workpieces carried by said conveyor come to rest outside of the effective working regions of said jaw and tool means.

25. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming a pair of endless flexible bands mounted for movement in closed circuits and having means providing along their lengths a series of notches forming workpiece carrying receptacles, motor driven propelling means engageable in successive receptacles for advancing said bands intermittently in alternate synchronism to operation of said jaw and tool means, said bands in portions of said circuits being generally parallel with their receptacles in paired alignment for receiving and carrying workpieces, first feed means upstream of said jaw means operable to deposit a succession of workpieces in said paired receptacles with an end portion of each workpiece projecting laterally exteriorly of one band so that it moves in a path passing between said jaw means to have work performed thereon, second feed means upstream of said jaw means operable to pass a fitting over said projecting end of each workpiece, means downstream of said second feed means operable to move said end portion of the workpiece out of its said receptacle, advance the fitting thereon to a predetermined location between said bands so that it moves in a path clear of said jaw means, and return the end portion of the workpiece to its receptacle, positive and negative sensing means upstream of said jaw means respectively sensitive to the presence and absence of a fitting in the latter-said path on each passing workpiece, circuitry operable responsive to operation of said positive and negative sensing means respectively to maintain and deactuate the motor drive for said propelling means, and motor means operable through said propelling means upon deactuation of said motor drive to advance said bands in phase with their said intermittent advancement a distance predetermined so that successive receptacles and the workpieces carried thereby come to rest outside of the effective working regions of said jaw and tool means.

26. Apparatus for performing work on elongate workpieces, such as lengths of tubing or the like, comprising, a work-performing mechanism having jaw means and tool means continuously motor reciprocated and synchronized to successively clamp a workpiece, advance the tool means in a work stroke, retract the tool means, and release the jaw means, means forming a pair of endless flexible bands mounted for movement in closed circuits and having means providing along their lengths a series of notches forming workpiece carrying receptacles, motor driven propelling means engageable in successive receptacles for advancing said bands intermittently in alternate synchronism to operation of said jaw and tool means, said bands in portions of said circuits being generally parallel with their receptacles in paired alignment for receiving and carrying workpieces, first feed means upstream of said jaw means operable to deposit a succession of workpieces in said paired receptacles with an end portion of each workpiece projecting laterally exteriorly of one band so that it moves in a path passing between said jaw means to have work performed thereon, second feed means upstream of said jaw means operable to pass a fitting over said projecting end of each workpiece, means downstream of said second feed means operable to move said end portion of the workpiece out of its said receptacle, advance the fitting thereon to a predetermined location between said bands so that it moves in a path clear of said jaw means, and return the end portion of the workpiece to its receptacle, means providing first and second detectors positioned in the latter-said path upstream of said jaw means, said first detector being operable responsive to engagement by a fitting on a passing workpiece to inactivate said second detector, circuitry operably interconnecting said second detector and the motor drive for said propelling means, said second detector being positioned to engage a portion of a workpiece in the latter-said path from which a fitting is absent, said second detector being operable responsive to detecting the absence of a fitting on a passing workpiece to actuate said circuitry for inactivating the motor drive for said propelling means, and means operable upon deactuation of said motor drive to advance said bands in phase with their said intermittent advancement a distance so determined that successive workpieces come to rest outside of the effective working regions of said jaw and tool means.

27. Apparatus for performing work on elongate workpieces, such as lengths of tubing or the like, comprising, a work-performing mechanism having jaw means and tool means continuously reciprocated and synchronized to successively clamp a workpiece, advance the tool means in a work stroke, retract the tool means, and release the jaw means, means forming a workpiece carrying conveyor movably mounted for carrying a succession of workpieces between said jaw means, motor driven propelling means operable to advance said conveyor intermittently in alternate synchronism to operation of said jaw and tool means, first feed means upstream of said jaw means operable to deposit a succession of workpieces on said conveyor with an end portion of each workpiece projecting free of said conveyor so that it moves in a path passing between said jaw means to have work performed thereon, second feed means upstream of said jaw means operable to pass a fitting over the projecting end of a workpiece, means downstream of said second feed means operable to shift the fitting on a workpiece away from said end portion to a location determined so that it moves in a path clear of said jaw means, positive and negative sensing means upstream of said jaw means respectively sensitive to the presence and absence of a fitting in the latter-said path on each passing workpiece, circuitry operable responsive to operation of said positive and negative sensing means respectively to maintain and deactuate the motor drive for said propelling means, and means operable upon deactuation of said motor drive to advance said conveyor in phase with its said intermittent advancement a distance determined so that successive workpieces come to rest outside of the effective working regions of said jaw and tool means.

28. Apparatus for performing work on elongate workpieces, such as lengths of tubing or the like, comprising, work-performing mechanism having tool means motor reciprocated cyclically in a work stroke and a retracting stroke, means forming a workpiece-carrying conveyor movably mounted for carrying a succession of workpieces to said mechanism, motor driven propelling means operable to advance said conveyor while said mechanism is retracted, means upstream of said mechanism operable to deposit a succession of workpieces at a predetermined location on said conveyor so that the workpieces are carried in a predetermined path, means providing first and second detectors operable respectively to detect the presence and absence in said path of a workpiece passing a location upstream of said mechanism, said first detector being operative to inactivate said second detector responsive to detecting the presence of a workpiece in said path, circuitry operably interconnecting said second detector and the motor drive for said propelling means, said second detector being operable responsive to detecting the absence of a workpiece from said path to condition said circuitry for inactivating said motor drive, and means operable upon inactivation of said motor drive to advance said conveyor a distance so predetermined that successive workpieces carried by said conveyor come to rest outside of the effective working region of said mechanism.

29. Apparatus for performing work on elongate workpieces, such as lengths of tubing or the like, comprising, work-performing mechanism having tool means motor reciprocated cyclically in a work stroke and a retracting stroke, means forming a workpiece-carrying conveyor movably mounted for carrying a succession of workpieces to said mechanism, motor driven propelling means operable to advance said conveyor while said mechanism is retracted, means upstream of said mechanism operable to deposit a succession of workpieces at a predetermined location on said conveyor so that the workpieces are carried in a predetermined path, means providing first and second detectors operable responsive to movement of said conveyor in each cycle to detect respectively the presence and absence in said path of a workpiece at a location upstream of said mechanism, said first detector being operative to inactivate said second detector responsive to detecting the presence of a workpiece in said path, circuitry operably interconnecting said second detector and the motor drive for said propelling means, said second detector being operable responsive to detecting the absence of a workpiece to condition said circuitry for inactivating said motor drive, energizing means operable in the subsequent working cycle of said mechanism to energize said conditioned circuitry for inactivating said motor drive, and means operable upon inactivation of said motor drive to advance said conveyor a distance so predetermined that successive workpieces carried by said conveyor come to rest outside of the effective working region of said mechanism.

30. The combination defined in claim 29 wherein the motor drive for said propelling means includes a ratchet wheel and a pawl reciprocated in a drive stroke and a return stroke in alternate synchronism to work and retracting strokes of said mechanism, said pawl being mounted for movement to and from operative engagement with said ratchet wheel, said energizing means being operable upon the return stroke of said pawl succeeding operation of said second detector to energize said conditioned circuitry, and means operable by said circuitry in energized condition to shift said pawl to disengaged relation from said ratchet wheel during said return stroke thereof.

31. Apparatus for performing work on elongate workpieces, such as lengths of tubing or the like, comprising, work-performing mechanism having tool means motor reciprocated cyclically in a work stroke and a retracting stroke, means forming a workpiece-carrying conveyor movably mounted for carrying a succession of workpieces to said mechanism, motor driven propelling means operable to advance said conveyor while said mechanism is retracted, means upstream of said mechanism operable to deposit a succession of workpieces at a predetermined location on said conveyor so that the workpieces are carried in a predetermined path, means providing first and second detectors operable responsive to movement of said conveyor in each cycle to detect respectively the presence and absence in said path of a workpiece at a location upstream of said mechanism, said first detector being operative to inactivate said second detector responsive to detecting the presence of a workpiece in said path, circuitry operably interconnecting said second detector and the motor drive for said propelling means, said second detector being operable responsive to detecting the absence of a workpiece to condition said circuitry for inactivating said motor drive, energizing means operable in the subsequent working cycle of said mechanism to energize said conditioned circuitry for inactivating said motor drive, means operable upon inactivation of said motor drive to advance said conveyor a distance so predetermined that successive workpieces carried by said conveyor come to rest outside of the effective working region of said mechanism, and reset means operable to condition said circuitry for reactivating said motor drive, said energizing means being operable in the subsequent working cycle of said mechanism to re-energize the conditioned circuitry for reactivating said motor drive.

32. A conveyor for elongate workpieces, such as lengths of tubing or the like, comprising, means forming a pair of endless flexible bands each having means providing along its length a series of spaced apart workpiece carrying receptacles, means mounting said bands for longitudinal movement in closed circuits, the portions of said two bands in portions of said circuits being spaced apart in generally parallel relation and the receptacles in said band portions being disposed in paired alignment for workpiece reception, motor driven means operably engaged with said two bands for advancing said bands substantially in unison, said motor driven means by engagement with said bands being operable to maintain said portions of said bands in substantially fixed longitudinal orientation relative to each other so that said paired receptacles substantially translate a workpiece through said portions of said circuits.

33. The combination defined in claim 32 wherein one of said circuits circumscribes the other of said circuits.

34. The combination defined in claim 32 wherein said circuits have other portions in which said two bands are closely adjacent and are engaged by said motor driven means.

35. The combination defined in claim 34 wherein said bands are in side-by-side contiguous relation at said other circuit portions.

36. Apparatus for performing work on elongate workpieces, such as lengths of tubing or the like, comprising, work performing mechanism having tool means motor reciprocated cyclicly in a work stroke and a retracting stroke, and a conveyor as defined in claim 32 wherein said portions of said circuits are disposed adjacent said tool means, said motor driven means including a primary drive intermittently operable in alternate synchronism to reciprocation of said tool means for advancing successive workpieces into alignment with said tool means, means operable to disconnect said primary drive, said motor driven means including a secondary drive operable responsive to disconnection of said primary drive to advance said bands a distance predetermined so that workpieces carried thereby come to rest outside of the effective working regions of said tool means.

References Cited in the file of this patent

UNITED STATES PATENTS

| | | |
|---|---|---|
| 1,475,736 | Backus | Nov. 27, 1923 |
| 2,295,852 | Le Jeune | Sept. 15, 1942 |
| 2,583,708 | Rose | Jan. 29, 1952 |
| 2,648,423 | Black | Aug. 11, 1953 |
| 2,736,358 | Burge | Feb. 28, 1956 |
| 2,961,027 | Ullman et al. | Nov. 22, 1960 |
| 3,052,278 | Baluck et al. | Sept. 4, 1962 |